Nov. 12, 1968　　　W. F. MORRIS, JR　　　3,410,101
POULTRY CHILLING METHOD AND APPARATUS
Filed Nov. 10, 1966　　　　　　　　　　　　　　　9 Sheets-Sheet 7

INVENTOR
WILLIAM F. MORRIS, JR.
BY
Mason, Fenwick & Lawrence
ATTORNEYS

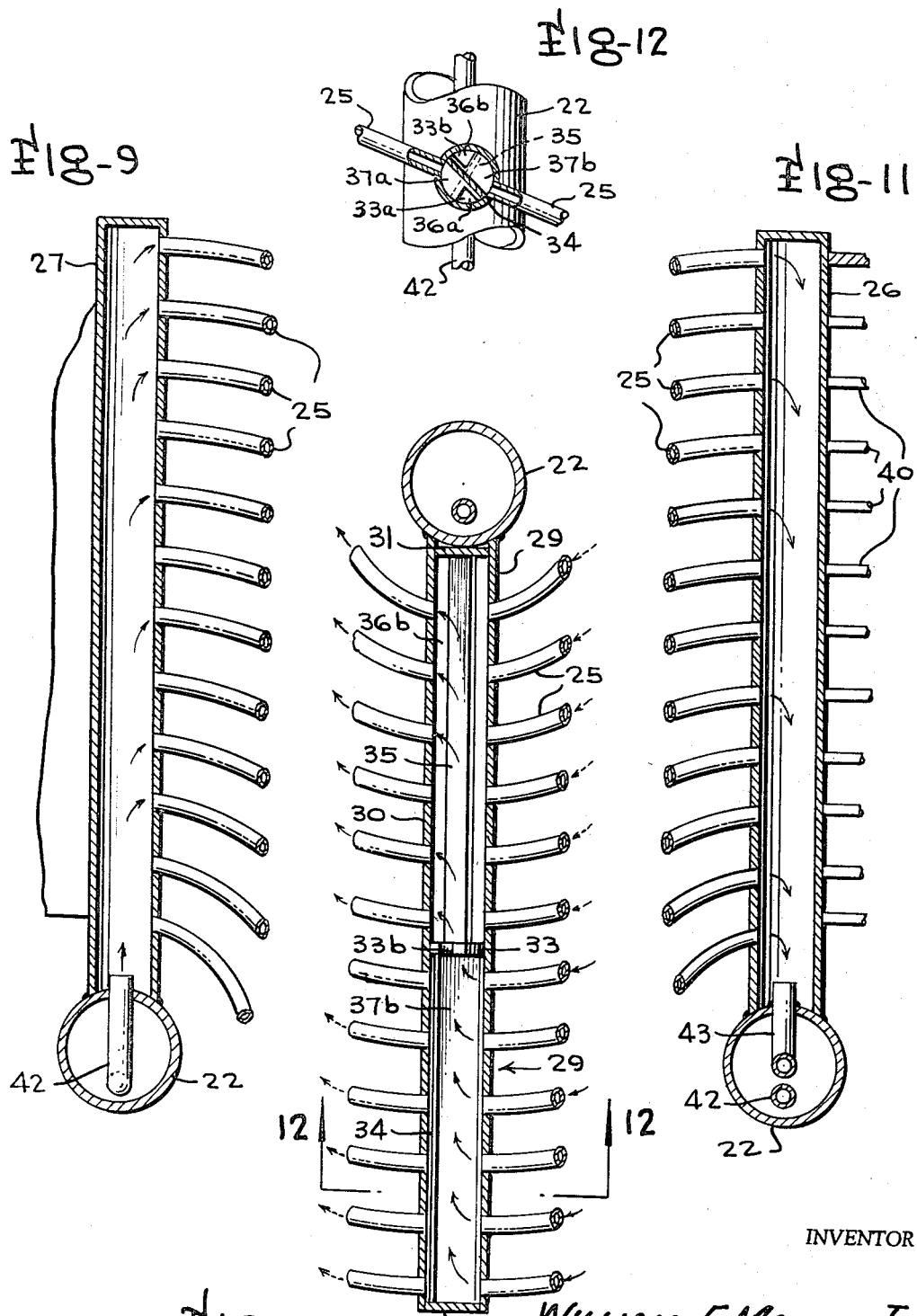

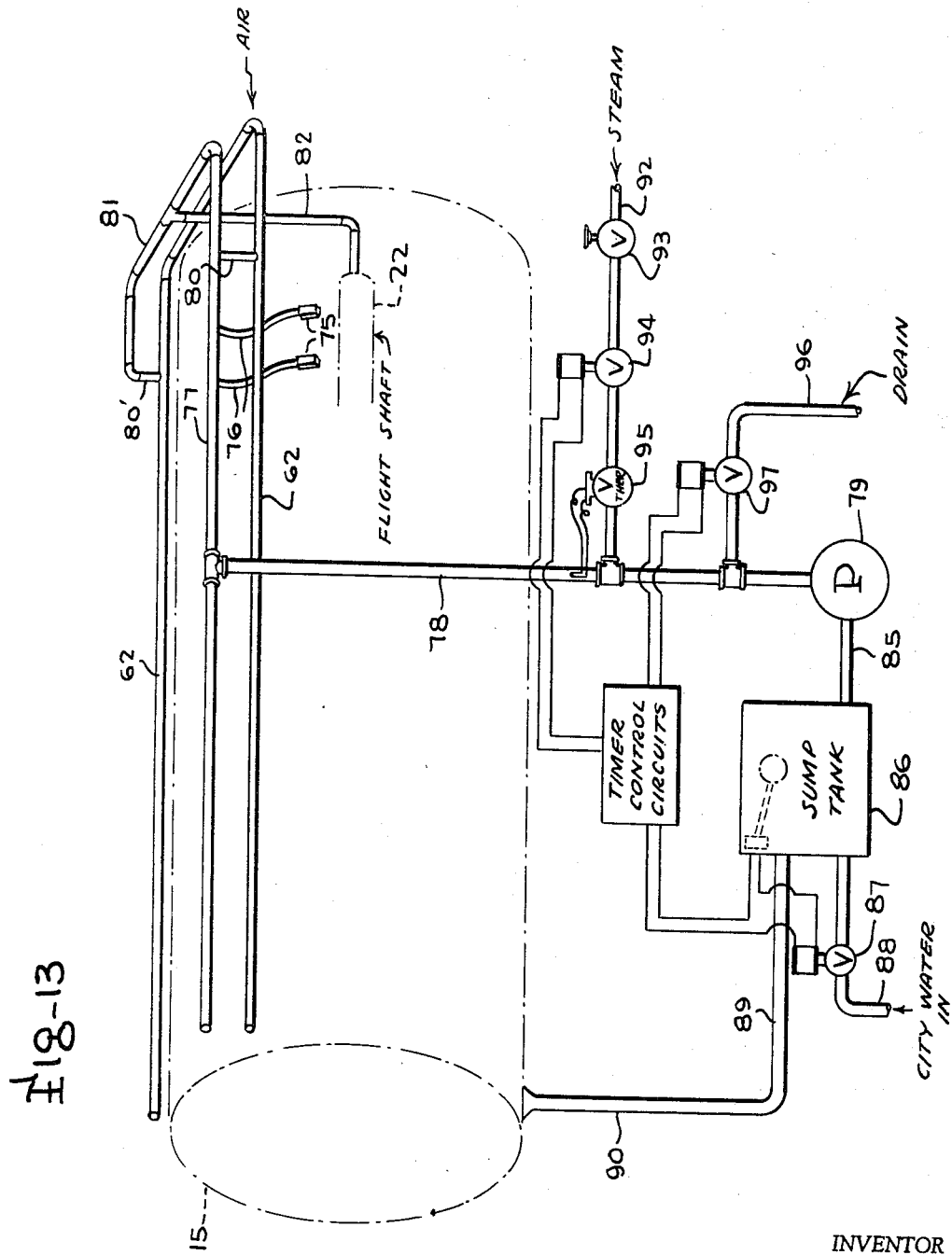

United States Patent Office 3,410,101
Patented Nov. 12, 1968

3,410,101
POULTRY CHILLING METHOD AND APPARATUS
William F. Morris, Jr., 801 Fayetteville St.,
Raleigh, N.C. 27601
Filed Nov. 10, 1966, Ser. No. 593,451
18 Claims. (Cl. 62—63)

ABSTRACT OF THE DISCLOSURE

The disclosure relates to an apparatus for chilling poultry and comprises a stationary elongated cylindrical tank for holding a supply of chilling liquid. The tank has a screw type conveyor rotatably supported on either end of the tank for advancing the poultry from a feed end to a discharge end. The screw conveyor is made up of an open network of refrigerant conducting tubes defining screw flights and a hollow center shaft providing refrigeration to the open network. On the discharge end of the conveyor a lift type device integral with the conveyor is provided to aid in discharge of the poultry. Air agitation is provided along the entire length of the tank to enhance the chilling rate and spray nozzle means are provided within the tank for periodic connection to a sanitizing liquid supply.

---

The present invention relates in general to a method and apparatus for continuously chilling poultry, and more partciularly to a method and apparatus for continuously chilling poultry in a poultry processing line immediately after the birds are eviscerated by advancing masses of the birds in large quantity through a liquid chilling medium in a manner subjecting the birds to progressively colder temperatures as they travel along a directed path of travel.

It has become common practice in the poultry industry to dress and eviscerate poultry in plants located near the source of production of the poultry and promptly ice pack or freeze the birds for shipment to retailers or further processors. The birds are commonly shipped either as whole carcasses or as cut up pieces. Because the birds are rapidly perishable after slaughter and evisceration and bacterial action begins promptly thereafter, it is important to reduce the temperature of the birds down to at least below about 40° F. to remove the body heat very rapidly after the slaughtering process to slow down the rate of bacterial growth. This is not an easy goal to attain when dealing with large numbers of birds moving rapidly through a processing line, due to the significant insulative characteristics of the bird carcasses which resist rapid transfer of heat to the chilling medium through a relatively compact mass of birds when subjected to chilling in large compactly assembled groups. These insulative properties of the bird carcasses or pieces, especially when assembled in large compact groups, render it impractical to defer chilling until the carcasses or pieces are packed in ice or frozen, as it is very difficult to insure rapid adequate removal of body heat from the poultry parts located near the center of such packed masses.

A general practice adapted heretofore in the poultry industry was to place a large number of the bird carcasses in one of a number of portable or movable chilling vats or open tanks containing an ice or water mixture, in which the birds were allowed to stand for an extended period, usually a number of hours, to reduce the body temperature of the carcasses. Such a procedure obviously involved significant interruption of the processing line when the birds are standing in a state of storage for an extensive cooling period and introduced substantial storage space problems.

More recently, open vat-type tanks of circulating fluid chilling medium through which the birds were continuously conveyed (as exemplified by my earlier U.S. Patent 3,004,407), and rotating drum type chilling tanks, containing a body of liquid chilling medium through which the birds were conveyed by helical or screw-type conveyor vanes or flights (as exemplified by U.S. patent No. 3,250,086), have been developed to speed up this chilling process. The latter devices have customarily employed a large circular feed opening and discharge opening at the feed and discharge ends of the tank concentric with the tank axis of rotation for introduction and discharge of the birds, limiting the maximum level of the liquid chilling medium to the lowermost level of the lowest of these openings, and therefore to a level located somewhat below the center line of the tank. There is room for considerable improvement in such continuous chilling devices, especially in regard to mechanical properties of the device, efficiency and rate of chilling, length of tank required to effect adequate chilling, improvement of washing action on the birds and reduction of grease contamination of chilling madium, extent and uniformity of moisture pick up in the birds during chilling, and retention of moisture content for improving the flavor and juiciness of the birds and enhancement of their appearance.

An object of the present invention therefore, is the provision of novel continuous poultry chilling method and apparatus wherein improvement in the above-mentioned properties and characteristics is attained in connection with an elongated cylindrical tank type chiller through which large groups of birds are advanced in a body of chilling liquid.

Another object of the present invention is the provision of a novel cylindrical tank type of poultry chiller having improved mechanical properties, wherein a greater depth of chilling liquid is present than in former rotary tank poultry chillers, and wherein improvement in the moisture content of the birds is achieved.

Another object of the present invention is the provision of a novel cylindrical tank type of poultry chiller having air agitation and mechanical agitation in selected zones thereof to improve the quality of the birds processed therein.

Another object of the present invention is the provision of a novel cylindrical tank type of poultry chiller having a rotatable open construction conveyor flight therein of refrigerant conducting helical tubes arranged in relation to plural air nozzles, tap water nozzles and chilled water inlet means to enhance efficiency of operation thereof and improve grease elimination and scrubbing of the bird carcasses.

Another object of the present invention is the provision of a novel cylindrical tank type of poultry chiller having improved means facilitating rapid and effective periodic clean up of the interior of the tank.

Other objects, advantages and capabilities of the present invention will become apparent from the following detailed description taken in conjunction with the accompanying drawings illustrating a preferred embodiment of the invention.

In the drawings:

FIGURE 1 is a side elevation view of a poultry chiller embodying the present invention;

FIGURES 2 and 3 are section views of the feed, and discharge ends of the poultry chiller, viewed from the lines 2—2 and 3—3, respectively, of FIGURE 1;

FIGURE 4 is a top plan view of the poultry chiller with parts broken away to reveal the interior thereof;

FIGURES 5a and 5b collectively form a vertical longitudinal section view of the poultry chiller, taken along the line 5—5 of FIGURE 4;

FIGURES 6 and 7 are vertical transverse section views, taken along the line 6—6 and 7—7 of FIGURES 5a and 5b;

FIGURE 8 is a fragmentary section view taken along the line 8—8 of FIGURE 4;

FIGURES 9 and 10 and 11 are section views showing details of the headers associated with the refrigerant conducting flight tubes, taken along the lines 9—9, 10—10 and 11—11 of FIGURES 5a and 5b;

FIGURE 12 is a transverse section view of the transfer header, taken along the line 12—12 of FIGURE 10;

FIGURE 13 is a diagrammatic view of the poultry chiller, showing the fluid circuits associated therewith.

Figure 1:
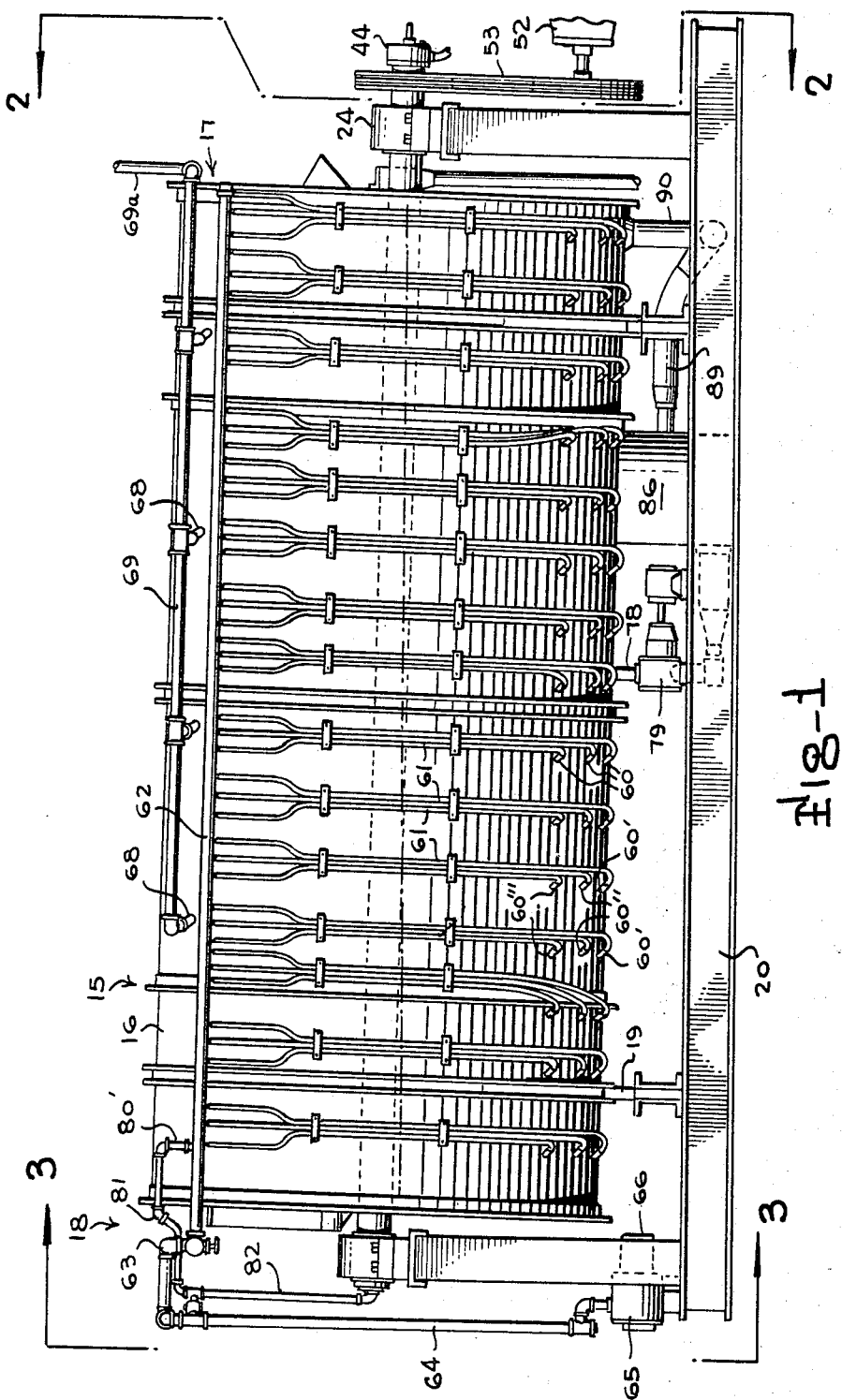

The poultry chiller of the present invention is in the form of an elongated cylindrical tank designed to receive the dressed poultry at one end and advance the same progressively therethrough. The birds are tumbled through a body of chilling liquid in the tank, for example a mixture of ice and water or preferably water chilled to near 32° F., the tumbling and feed of the birds effecting a somewhat pumping action inducing moisture into the carcasses. Throughout the length of the tank, the birds are subject to air agitation by compressed air introduced into the body of chilling liquid in the lower regions of the same, and to some mechanical agitation from axially extending rod members carried at the periphery of a rotating structure in the chiller. Additionally, in an intermediate zone of the tank, the birds are subjected to enhanced mechanical agitation, for example by inclined projections carried by the rotating structure in the chiller. In the discharge end zone of the chiller, the birds are subjected to air agitation only so as not to disturb the normal progress of rigor development and give a resulting product of firm birds with stiff joints. The chilled makeup water for the chiller is introduced at the discharge end of the chiller, so that the lowest chilling temperatures prevail at this end and counterflows against the direction of product movement. The air agitation produced at the feed end zone, where the birds and the chilling liquid are near room temperature, effectively scrubs the birds and scrubs off much of the grease in the carcasses, which floats to the surface and is withdrawn by an overflow trap and also serves to agitate the fluid around the birds to enhance thermal transfer. Tap water sprays in the side of the tank adjacent the rising portion of the flight and above the liquid level in the tank skim the grease off of the birds and the surface of the chilling liquid and direct the same into the overflow trap. At the discharge end of the tank, the birds are elevated to the level of the discharge opening in the tank end wall and dumped out into a suitable chute or conveyor for transport along the processing line to the packaging station.

Referring now to the drawings illustrating a specific embodiment of the poultry chilling apparatus, like reference characters being used to designate corresponding parts throughout the several figures, the apparatus comprises a large stationary cylindrical tank 15 of the type formerly used in rotary drum type poultry chillers, having a cylindrical wall 16, a feed end 17 defined by a circular end wall 17' and a discharge end 18 defined by a circular end wall 18'. The tank 15 is supported in any suitable manner on a base, as by saddle beams 19 rising from a channel iron rectangular base frame 20. The drum 15 is disposed on a slight grade rising from the feed end 17 to the discharge end 18, for example in a tank 15 having an axial length of about 16 feet and a diameter of about seven feet, the discharge end 18 is about 3 to 4 inches above the level of the feed end 17.

Figure 3:
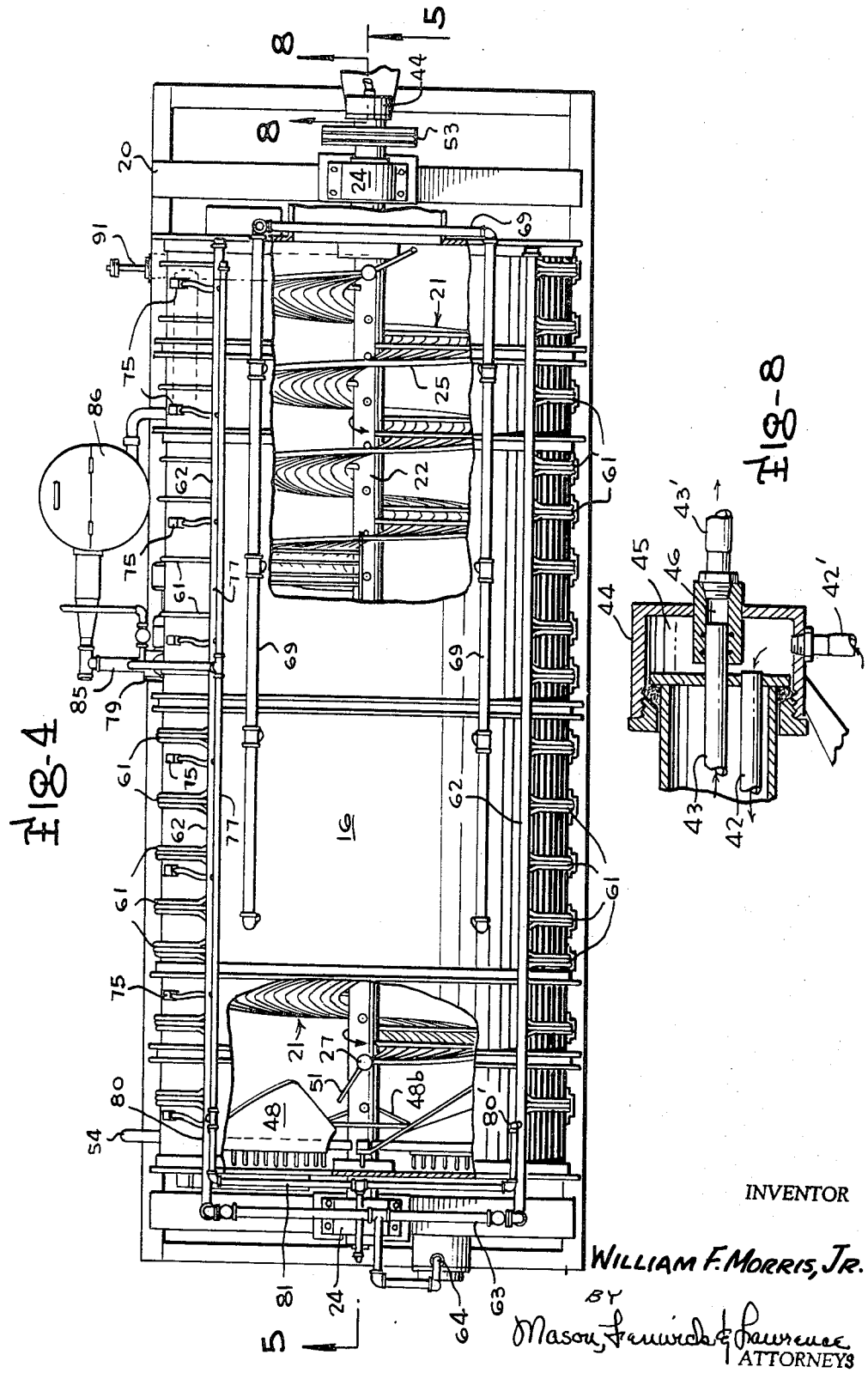
Figure 4:
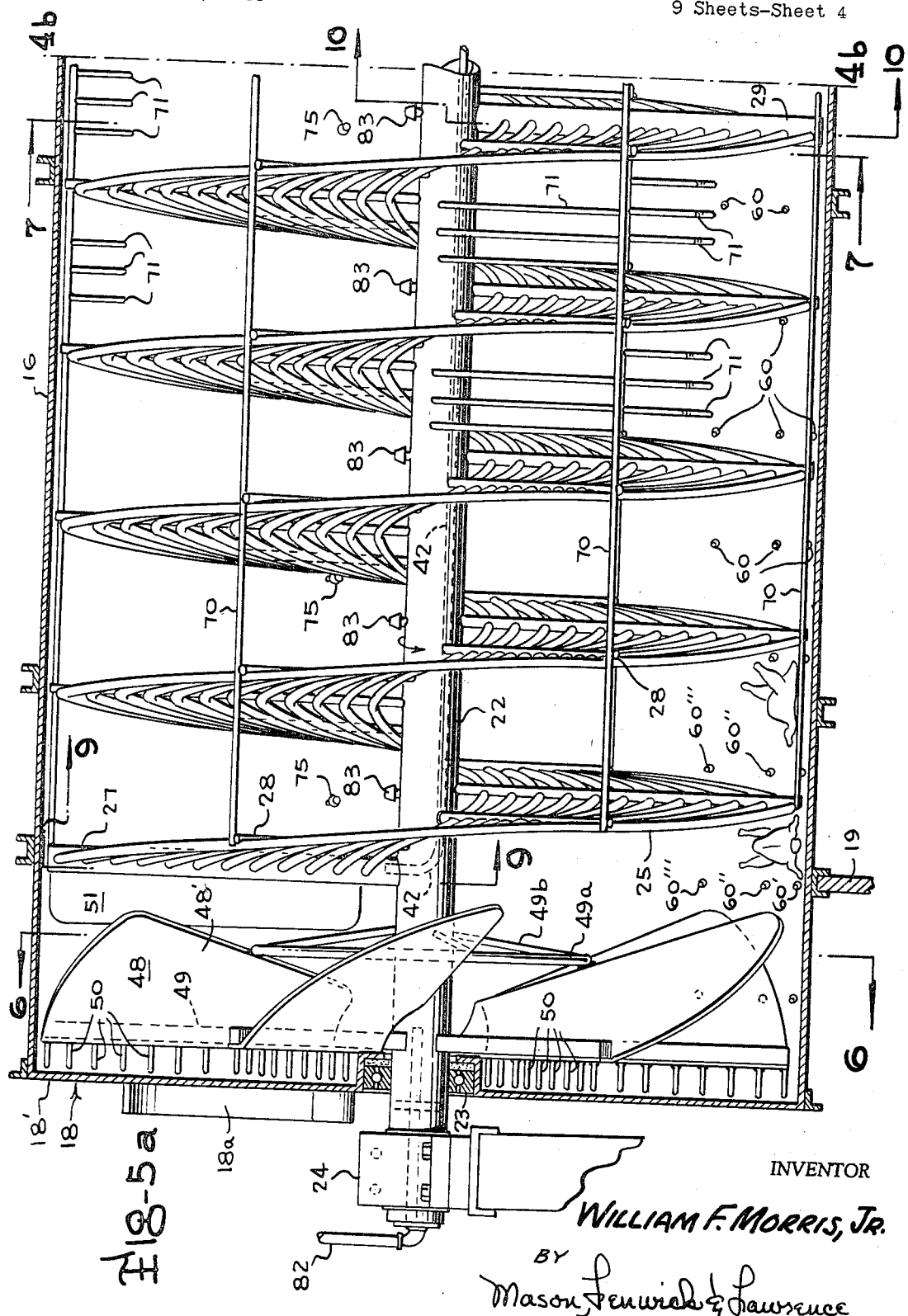
Figure 5:
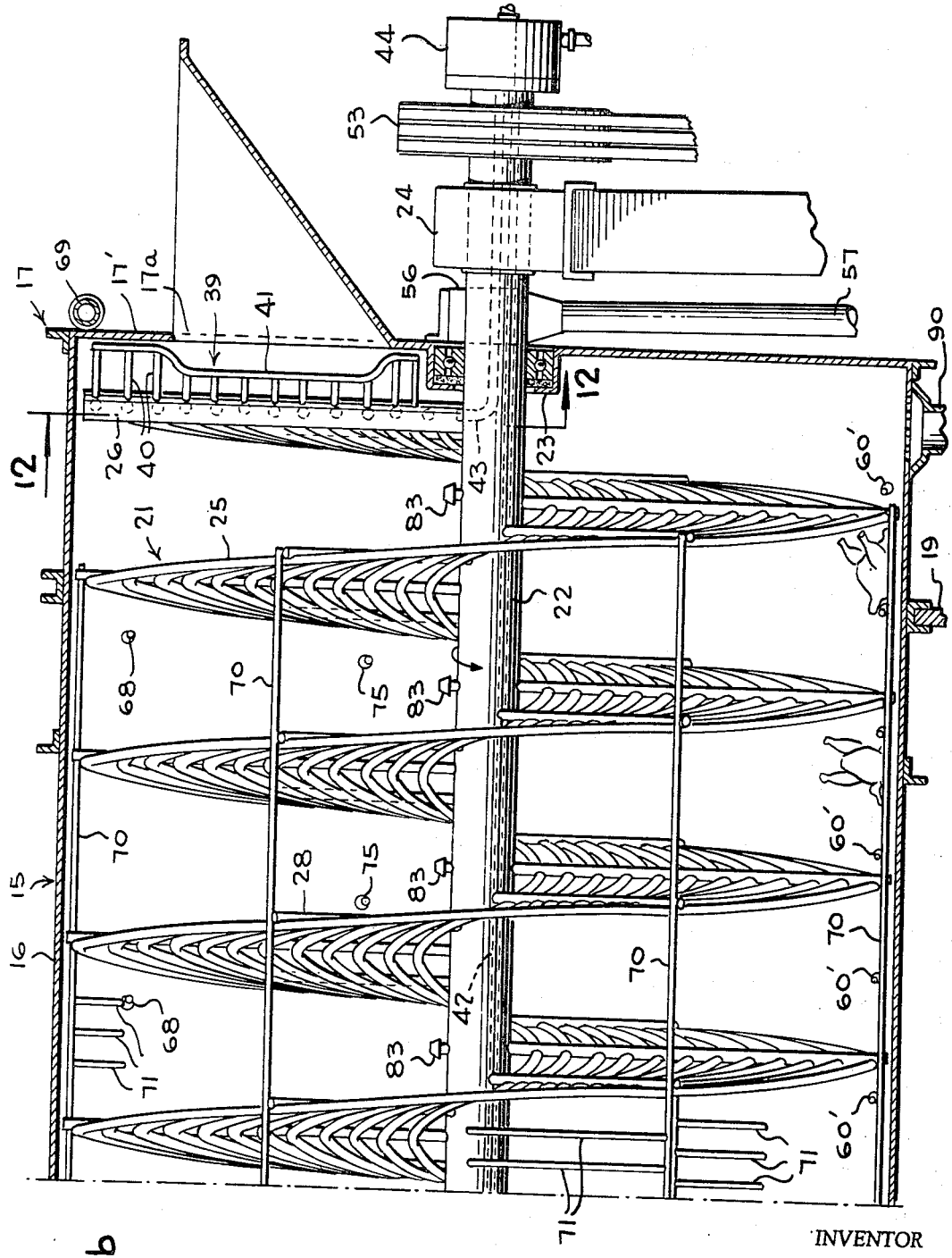
Figure 6:
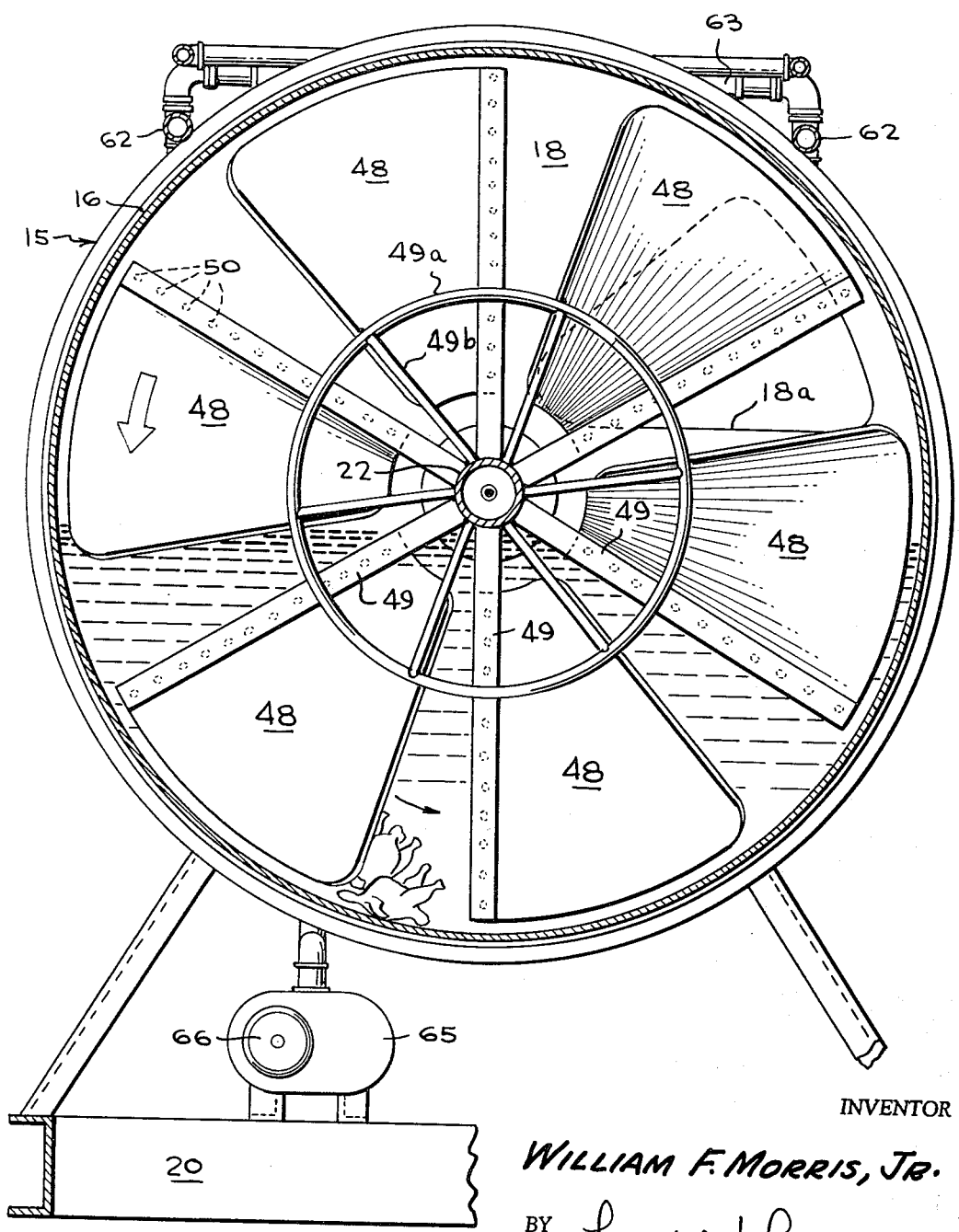
Figure 7:
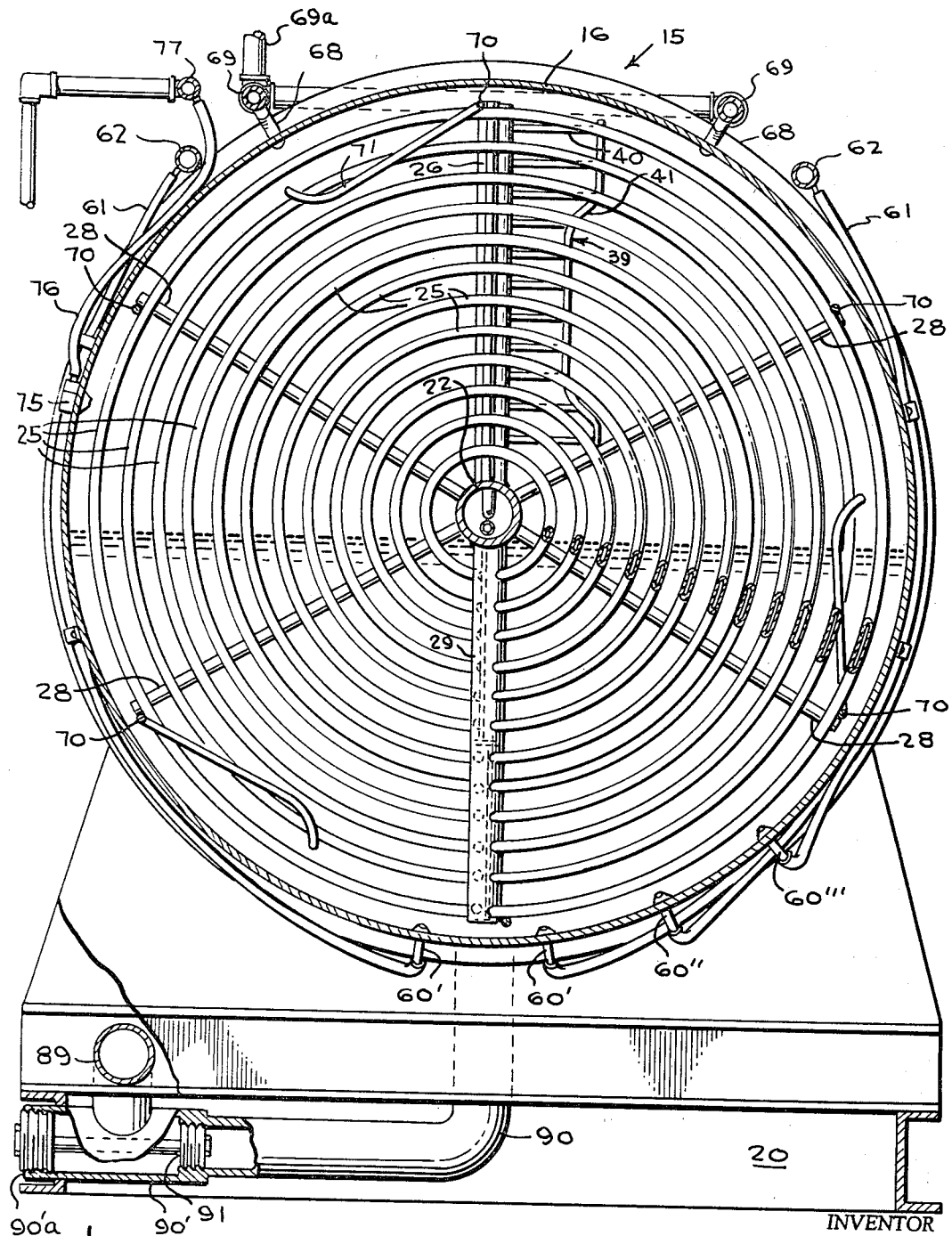

Within the tank 15 is a spiral flight or screw conveyor 21 formed on a hollow center shaft 22 aligned with the center axis of the tank, the flight having a helix of open network construction so that chilling water or liquid chilling medium maintained at a liquid level about one inch below the centerline of the shaft 22 at the feed end can readily flow through the spaces between the elements forming the convolutions of the helix while the birds are advanced from the feed end to the discharge end by the spiral convolutions of the flight 21. An inlet opening 17a is provided in the feed end wall 17' above the shaft 22, and a discharge opening 18a is provided in the end wall 18' to the left side of the shaft 22 as viewed in FIGURE 3, for introduction and withdrawal of the birds relative to the tank 15. The hollow conveyor shaft 22 extends in alignment with the center axis of the tank 15 through suitable seals, indicated diagrammatically at 23, in the feed and discharge end walls 17', 18' and is rotatably supported at its opposite ends in bearing supports 24 mounted on the base frame 20. In the preferred embodiment, the spiral flight 21 is formed of a plurality of radially spaced helical tubes 25 of good thermal conducting properties, for example, of ¾ inch diameter aluminum tubing, arranged in spiral paths of different diameter concentric with the axis of the shaft 22 and extending substantially the length of the tank 15. The helical tubes 25 in one example are arranged in cylindrical paths whose radii differ by about 2½ inches and are connected at their opposite ends adjacent the feed end 17 and discharge end 18 to hollow radial headers 26 and 27 fixed to the center shaft 22 with the interior bores of the headers 26 and 27 in fluid communication with the bores of the tubes 25 and the hollow interior of the shaft 22 for circulation of refrigerant therethrough supplied in a manner to be hereinafter described. Intermediate the headers 26, 27, the helical tubes 25 are rigidly supported on solid radial posts 28 fixed to the shaft 22, for example at about 60° angles to each other and lying in the spiral path defined by the tubes 25. The posts 28 are preferably provided with recesses of semicircular cross section at appropriate radial positions along the same sized to conform to the confronting halves of the tubes 25, into which the tubes 25 are nested and seam welded over the whole of the corresponding confronting surfaces of the recesses and tubes 25 to eliminate any crevices which might collect contaminents or undesired foreign matter.

At approximately the longitudinal center of the flight 21, a radial transfer header 29 is provided to interconnect the outer half and the inner half of the helical tubes 25 between the transfer header 29 and the header 26 with the inner half and outer half, respectively, of the tubes 25 between the transfer header 29 and the header 27, to substantially equalize the fluid flow resistance in the plural helical tubes 25 which would otherwise exist due to their differences in length. A convenient construction of this transfer header 29 is illustrated in FIGURES 9, 10 and 12 hereof, the header 29 in this example being formed of elongated header tube 30 of corresponding axial length to the headers 26, 27 and posts 28, which is closed off at its inner and outer ends by baffles 31 and 32 and at its longitudinal center by baffle 33 to subdivide the header 29 axially into inner and outer chambers. These inner and outer chambers are likewise subdivided into semicylindrical chambers by diametric partition plates 34 and 35 which span the diameter of the header 29 and are arranged at right angles to each other. The middle baffle 33 is provided with quadrant-like openings 33a, 33b, therein communicating one of the inner chamber compartments 36a with an outer chamber compartment 37a and the other inner chamber compartment 36b with the outer chamber compartment 37b, to thereby effect tarnsfer of refrigerant between selected inner and outer groups of helical tubes 25.

The header 26, which is located in the described example about six inches from the feed end wall 17', is provided with an open network of rigid rods forming a rigid extension 39 of the flight, projecting generally along the extended spiral path of the tubes 25 toward the feed end wall 17' to pick up any birds or objects which may lie in the zone between the header 26 and feed end wall 17' to insure advance of the same toward the discharge end 18. The extension 39 includes radially spaced solid rods 40 extending from the header 26 substantially along continuations of the flight tubes 25 and a transverse rod member 41 connected to the ends of the rods 40. The shape of the rod member 41 and the length of the rods 40 in the region of the feed opening 17a are such that the extension 39 is set back about 3 to 4 inches from the end wall 17' to avoid shearing action between the extension and the edges of feed opening 17a which might injure the birds, while the remainder of the extension projects very close to the feed end wall 17'.

The flight tubes 25 are designed to be supplied with a refrigerant, such as glycol, from a suitable source by coupling the same to the tubes 25 through the shaft 22, as for example by means of supply and return pipes 42, 43 extending from the feed end of shaft 22 to the header 27 adjacent the discharge end 18 and to the header 26 adjacent the feed end 17, respectively. The supply and return pipes 42, 43 which must rotate with the shaft 22 are terminated at the feed end of the shaft 22, in a suitable coupling which maintains the supply and return isolated, such as the coupling 44 shown in FIGURE 8, wherein the coaxial chambers 45, 46 couple the supply pipe 42 and return pipe 43 to stationary conduits 42' and 43' connected to the refrigerant source.

Adjacent the discharge end wall 18' are a plurality of poultry lifting blade members 48 carried by radial posts 49 extending from the shaft 22 at the discharge end 18 and lying in the same transverse plane to lift the bird carcasses advanced into the zone of action of the lifting blade members 48 by the flight 21 and discharge the same through the discharge opening 18a in the end wall 18'. The lifting blade members 48 may have enlarged inclined surface portions 48' as shown, disposed to urge the birds outwardly through the discharge opening 18a when lifted to the level of the lower edge of the discharge opening and the support rods 49 therefore are preferably provided with a plurality of radially spaced, parallel fingers or tines 50 formed for example from short rods about ½ inch long pojecting sufficiently close to the discharge end wall 18', and disposed sufficiently close together to engage birds which may collect between the discharge end wall 18' and the support rods 29 and lift them to the discharge opening 18a. The blade members 48 may be further braced by a circular ring 49a welded to their upstream edges 48a and inclined bracing rods 49b extending from the shaft 22 supporting the ring 49a in concentric relation to the shaft 22.

To insure that the bird carcasses are fully advanced by the flight 21 into the zone of action of the lifting blade members 48 and do not become lodged in spaces between the downstream or discharge end of the flight 21 and upstream end of the lifting blade assembly, an extension baffle 51 which is elongated radially of the shaft 22, and inclined relative to the shaft axis is fixed to the header 27 to sweep through the zone between the header 27 and the upstream end of the lifting blade assembly defined by blade members 28, bracing ring 49a and rods 49b, to advance the birds from the discharge end of the flight to the blade member.

Figure 2:
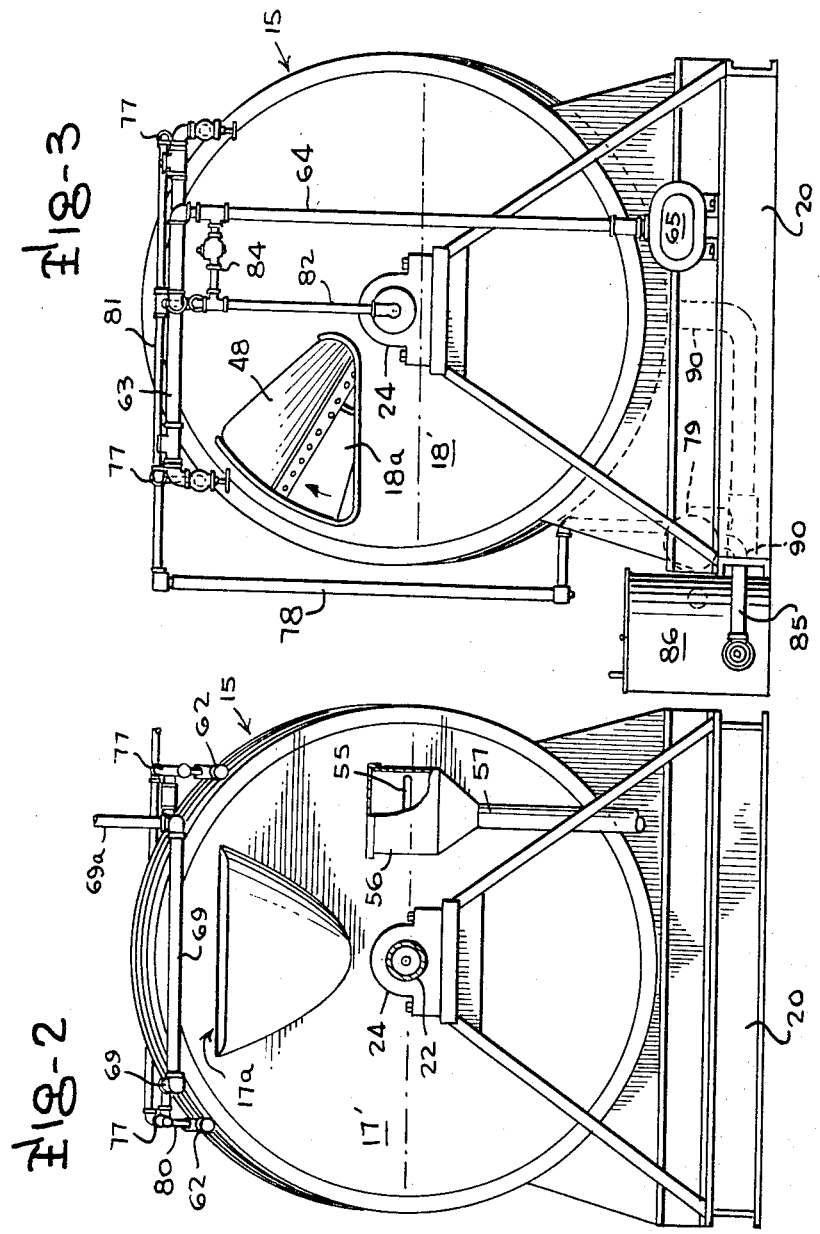

The flight 21 is driven in any suitable manner as by an electric motor 52, which may have a reduction unit associated therewith, and a chain and sprocket drive 53 coupling the output shaft of the motor 52 with the shaft 22 at one end of the shaft. The tank 15 is designed to contain a body of chilled water therein through which the poultry is advanced by the flight 21 to rapidly chill the poultry caracsses to a temperature close to 32° F. Chilled water obtained from an external water chiller or cooling system, which may be any commercial type of water chiller but is preferably one capable of proceding ingredient water (i.e., of sufficient purity to meet accepted sanitary standards) at a temperature very close to 32° F. is introduced into the tank 15 through a chilled water inlet 54 located on the same side of the tank axis as the discharge opening 18a about 3 to 4 inches below the water level therein and close to the discharge end wall 18', for example about 6 inches from end wall 18'. The chilled water counterflows through the tank 15 relative to the direction of product movement and exits from the tank through an overflow opening 55 in the feed end wall 17' to the right of the center of the drum as viewed in FIGURE 2, through which overflow water passes into an external overflow receiver 56 and drainpipe 57 for conducting the overflow water and any entrained contaminants, especially grease floating thereon, to any desired external disposal facility, the liquid level being maintained by the overflow opening 55 about one inch below the centerline of the center shaft 22 at the feed-end 17.

Throughout the passage of the birds along the length of the tank 15, they are subjected to air agitation to effect scrubbing of the birds by the air agitated water and floatation of the grease released from the poultry tissue, particularly in the feed end region of the tank where the birds and the chilled water are nearer room temperature, to the water surface and out the overflow opening 55. The air agitation is achieved by providing air nozzles 60 along the bottom zone of the tank 15, which in one practical example are aimed at a 45° angle to oppose the direction of rotation of the flight and at a 45° angle toward the discharge end 18 of the tank and are located in transverse vertical planes spaced about 12 inches apart axially of the tank starting about 6 inches from either end.

It has been discovered that when these air nozzles are so distributed that a quiet zone or region of substantially no air agitation occurs in some part of the tank, the grease floating on the water surface tends to collect in this quiet zone. Consequently, the location of the air nozzles 60 is so chosen that a quiet zone is established near the overflow opening 55 to cause the floating grease to migrate to and collect in this region to enhance removal of grease from the tank. In the practical example herein illustrated, the nozzles 60 on the side of the tank 15 opposite the overflow opening side are arranged at each of the previously mentioned axially spaced transverse planes in three tiers or horizontal rows, designated 60', 60'', 60''', spaced successively about 6 inches, 12 inches and 12 inches circumferentially from the intersection of the vertical longitudinal center plane of the shaft axis with the tank bottom. However, the nozzles 60 on the overflow opening side of the tank over approximately the half of the tank nearest the feed end 17 are reduced in number to about one-third of the nozzles in the comparable region of the other side and are located to correspond to the lowermost row of nozzles 60' on the other side. The remainder of the nozzles 60 on the overflow opening side in the half of the tank nearest the discharge end 18 correspond in number and location to the nozzles on the opposite side. The air nozzles 60 are conveniently coupled by branch conduits 61 such as plastic or flexible tubing to air supply headers 62 running along both sides of the tank 15 over substantially the length thereof, which are connected together at one end, for example the discharge end 18, as by transverse header leg 63 valved at each end thereof and vertical supply conduit 64 to an air compressor 65 and drive motor 66 suitably mounted on the base frame 20.

It may be desirable to reduce the supply of air from the compressor 66 to the header 62 and nozzles 60 at one side of the tank 15, relative to the other side to further vary the distribution of air agitation.

To further increase removal of grease from the birds, improve the cleaning thereof, and purge grease which floats up to the surface of the water, a series of tap water nozzles 68 may be provided in the tank wall 16 at both sides of the longitudinal center vertical plane over about ½ to ⅔ of the axial length of the tank from the feed end 17. These tap water nozzles 68, in the practical example herein illustrated, are spaced about three feet apart axially of the tank and are directed at about a 45° angle toward the feed end 17 and 45° downward to discharge a spray pattern of tap water to spray the surface of the water and bird carcasses which periodically rise above the water surface. Due to the direction of the tap water spray discharged by the nozzles 68, the grease floating on the surface of the water is caused to migrate toward the feed end 17 and eventually spill through the overflow opening 55 into the receiver 56 and exit down the conduit 57. The tap water nozzles 68 are also supplied from common water headers 69 extending alongside the tank 15 connected by a valved conduit 69a to a suitable source of city water.

During advancement of the birds, a pumping action is exerted on the bird carcasses due to the forces exerted on them by the flight 21 which also includes lifting components and complex squeezing and relaxing forces arising from the interaction of the other bird carcasses in the mass of birds being advanced, contributing to a beneficial increase in moisture content in the poultry tissues to improve the juiciness of the product.

To achieve maximum moisture content in the birds, this pumping action is supplemented by a degree of mechanical agitation throughout the length of the flight 21 and by material increase of mechanical agitation of the carcasses in the central longitudinal region of the tank, in addition to the air agitation and the pumping forces incidental to advancement of the mass of birds by the flight. Some mechanical agitation is achieved throughout the length of the flight by long support rods 70 fixed to the outer ends of radial posts 28 at each 60° position about the shaft 22 in parallelism to the axis of shaft 22 to span the length of the flight. These axial roads 70 at the perimeter of the flight are primarily provided to lend structural support to the flight members, but also produce a mild tumbling or agitating action on the birds in the lower region of the tank as they rotate through the region and move the birds from the path swept by the rods 70. Also, in the central longitudinal region of the tank, for example between the fourth and seventh convolutions or cycles of the flight, increased mechanical agitation is produced by a plurality of lifting fingers or projections 71, three of which are provided between the successive flight convolutions of this central region in the illustrated example.

The lifting fingers of each set are fired at their inner ends to selected ones of the axial rods 70, for example, every other one of said rods 70, and extend in parallel transverse planes (i.e., planes normal to the axis of shaft 22) toward the next radial post 28 in a direction opposite the direction of flight rotation, along a common plane inclined somewhat inwardly toward the shaft 22 relative to the tangent of the flight perimeter at their point of origin, and terminate in outwardly curving end portions spaced slightly inwardly from the flight perimeter.

It will be understood that the poultry chiller of the present invention is positioned in a poultry processing line of the kind usually employed in poultry processing plants. Conventional poultry processing lines usually involve manual removal of the live poultry from the coops in which they are delivered to the plant and hanging of the same on an overhead conveyor, the poultry being slaughtered immediately after hanging of the same on the overhead conveyor. The carcasses are then scaled and picked while on the overhead conveyor, after which they are transferred to an evicerating line where the vicera is cut and pulled out or drawn, inspected, and then disposed of. The carcasses which at this stage are rapidly perishable due to bacterial action, are promptly loaded into the chilling tank 15 by manual or mechanical conveyance to the feed opening 17a in the feed end wall 17'.

The birds fall into, or are urged by the rotating flight 21 downwardly into, the body of chilled water in the tank 15 maintained at a level to about one inch below the centerline of the shaft 22 at the feed end 17. The spiral or helical configuration of the flight convolutions defined by the spaced concentric tubes 25 progressively advance the birds from the feed end 17 to the discharged end 18, while tumbling the carcasses about in a random fashion within a large mass of carcasses resulting in involved interaction producing pumping forces on the carcasses. This may arise from impact of the flight with the carcasses, impact of the carcasses with each other, variation of the weight imposed on individual carcasses by other carcasses in the mass as their positions change from lower to higher levels in the mass, and mechanical agitation from the axial rods 70 at the flight perimeter, to mention some of the pumping action inducing forces involved. In the feed end region of the tank 15, the chilled water is at a higher temperature than at the discharge end zone near the chilled water inlet 54 due to thermal transfer from the birds to the water as the water progresses the length of the tank to the feed end, so that the water at the feed end approaches room temperature or is at a significantly higher temperature than at the inlet 54. The grease in the bird tissues is released into the surrounding water, especially in this zone of the tank where higher temperatures prevail and floats to the surface of the water. This is enchanced by the scrubbing action produced by the air agitation of the water arising from air discharge from nozzles 60, which readily dislodges grease which migrates to the surfaces of the birds.

Removal of the grease which reaches the surface of the carcasses is further facilitated by the washing action of the tap water spray discharged from nozzles 68 impinging on carcasses which become exposed at or above the surface of the chilling water. The distribution of the air nozzles 60, providing a quiet zone over the portion of the tank nearer the overflow opening 55 causes the floating grease to tend to collect in this zone where it can readily spill through the overflow opening. The direction of the tap water sprays at 45° angles downwardly and toward the feed end also assists in urging the floating grease at the water surface toward the overflow opening 55 and into receiver 56.

As the birds reach the central longitudinal zone of the tank 15, the pumping action previously described is further enhanced by the lifting fingers or projections 71, which engage the birds during rotation of the flight and force them inwardly from along the tank wall toward the shaft 22, especially the birds weighted down along the bottom of the tank by the overlying mass of birds, effecting a mixing and mechanical agitation which produces still greater pumping forces and increases expression of grease and air from the tissues and pick up of moisture therein. The air agitation, of course, continues throughout this region and the remainder of the flow path to the zone of the lifting blade members 48. When the birds reach the zone of the lifting blade members 48, they are urged upwardly along the rising portion of the flight by the inclined surfaces 48' and tines 50 to the level of the discharge opening 18a and expelled therethrough to any convenient receiving facility, such as a conveyor belt on which the chilled carcasses are transported to a packaging station where the birds are ice packed as whole carcasses for shipment or are cut into pieces and ice packed for shipment or frozen in various forms.

The chilled water introduced into the tank 15 at the water inlet 54 is very near 32° F. and rapidly chills the birds during their passage through the tank 15 to a temperature at least below about 40° F. to reduce their temperature to levels which retard bacterial action or deterioration until they can be ice packed or frozen to maintain the birds below selected temperature maximums for preservation. While the temperature of the chilling water increases from the discharge end 18 to the feed end 17 due to absorption of carcass heat all along the length of the product flow path, increase in chilling water temperature is minimized by continuous flow of refrigerant, such for example as glycol, through the tubes 25 of the flight, coupled through the supply pipe 42 within shaft 22 and header 27, and returned from header 26 and return pipe 43 to a suitable external refrigerant source. The refrigerant in flight tubes 25, in intimate thermal exchange relation with the chilled water through the metallic walls of the tubes 25, extracts heat from the water when the water temperature is high enough to cause vaporization of the refrigerant, in a manner well known to persons in the refrigeration art, to reduce the temperature gradient of the water between the discharge and feed ends and improve chilling efficiency. The chilling water exits from the tank 15 through the overflow opening 55 and is conveyed to any desired disposal facility.

A significant problem in cylindrical tank type poultry chillers of this general type has been the extensive time and labor consumed in satisfactorily cleaning the interior of the tank to maintain acceptable sanitary standards. The interior of tank and all elements therein exposed to contact with the product need to be thoroughly scrubbed down after each run of poultry therethrough. This has customarily involved an extensive shutdown time, as personnel have heretofore been required to enter the tank through access openings provided in the top thereof and manually scrub down all of the exposed interior surfaces.

To reduce the labor and length of shut-down time involved in such clean-ups, the poultry chiller of the present invention includes an automatic sanitizing system which either completely eliminates the need of manual cleaning by personnel inside of the tank or materially reduces the need therefore.

To this end, the tank 15 is provided with a plurality of cleanup nozzles, arranged in two sets in the exemplary embodiment illustrated herein, one of which is formed of the set of nozzles 75 disposed in the wall 16 of the tank on the rising side of the rotating flight 21 and disposed approximately 13–16 inches above the water level at axially spaced positions approximately 2 feet apart along the length of the tank starting from approximately 6 inches from each end wall. These cleanup nozzles 75 are preferably provided with nozzle heads establishing a substantially fan-shaped spray pattern of about 50° directed against the surface of the flight 21 as the flight rotates to effectively clean the flight surfaces.

It will be appreciated that other conventional nozzle heads may be employed such as nozzles provided cone-shaped spray patterns or other pattern configurations to cover the desired regions within the tank. These stationary cleanup nozzles 75 are connected externally of the tank 15 by suitable conduit means 76, such as flexible tubing, to a cleanup header 77, which may be spaced slightly above and aligned with the air header 62 on the corresponding side of the tank. The clean up solution header 77 is connected at a suitable point, for example substantially midway along its length, to a vertical supply pipe 78 extending downwardly along the adjacent side of the tank to a conventional pump 79 supported on the base frame 20 and driven by an electric motor or other prime mover. Adjacent one end of the cleanup solution header 77, such as the end near the discharge end wall 18′, a branch duct 80 provided with a suitable internal orifice interconnects the header 77 with the air header 62 on the corresponding side, and a transverse extension 81 of the header 77 extends across the discharge end 18, for example, between the end wall 18′ and transverse header leg 63 of air header 62 and connects at its opposite end through a similar branch duct 80′ and orifice with the air header 62 on the opposite side of the tank. These branch duct connections 80, 80′ with their internal orifices are to admit a selected proportion of the cleaning solution in the header 77 to the air headers 62 and the tubes 61 and nozzles 60 connected therewith to clean out the tubes and nozzles during cleaning of the tank.

Midway across the transverse extension 81 of header 77 is a depending branch 82 connected to the interior of the shaft 22 to admit cleaning solution from the header 77 into the shaft 22 for discharge through cleaning nozzles 83 mounted on the shaft 22, preferably along a rectilinear axis at the surface of the shaft paralleling the shaft axis, the nozzles 83 being located approximately midway between each convolution of the flight 21 and being directed to spray radially outwardly of the shaft with a connical spray pattern. The depending branch 82 just described is connected somewhere along its length by a branch duct 84 with the supply conduit 64 of the air pressure system to maintain sufficient air pressure within the hollow bore of the shaft 22 and within the cleanup nozzles 83 during normal operation of the chiller to keep water within the tank from entering the nozzles 83 which are submerged therein.

The inlet to the pump 79 is connected by suitable conduit means 85 to the outlet of a sump tank 86, having a basket strainer of conventional construction removably disposed in the lower portion thereof for receiving suitable sanitizing chemicals, and having a float at a suitable level therein coupled to a valve 87 in a city water supply inlet 88 to the sump tank 86 to cut off the valve 87 when the water reaches a selected level. The sump tank 86 is also connected to an inlet conduit 89 having a tangential connection with the sump tank and connected at its other end to a transverse extension of drain conduit 90 extending from a drain opening at the bottom of the tank 15 immediately adjacent the lower feed end wall 17′ thereof to an outlet opening 90a′ in the web of the channel member forming one side of the base frame. The drain conduit 90 is preferably of a relatively smaller size pipe, for example 4 inch inner diameter pipe, over most of its length from the tank to a point spaced slightly inwardly from the outlet opening 90a′ thereof, and is of enlarged diameter over its remaining portion, for example of about 6 inches inner diameter, providing an enlargement 90′ adjacent the outlet opening 90a′ thereof which is joined by the inlet conduit 89. Internal threads are provided in the portion of the smaller diameter drain conduit 90 immediately adjacent the enlargement 90′ and at the outlet opening 90a′, to cooperate with a reversable plug 91 having an externally threaded 4 inch diameter cylindrical head on one end thereof and an externally threaded 6 inch diameter cylindrical head on the other end thereof interconnected by a rigid stub shaft.

In the normal condition of operation of the chiller to chill poultry, the smaller diameter head is threaded into the smaller diameter drain conduit 90 to completely close off the same and block admission of water through the drain conduit to the enlarged diameter portion 90′. However, during the operation of the sanitizing or cleaning up system, the plug 91 is withdrawn and reversed relative to its normal condition by threading the larger diameter head into the threads at the outlet opening 90a′, thereby communicating the sump inlet 89 through the enlarged drain conduit portion 90′ with the drain inlet opening at the bottom of the tank.

Suitable means are provided to selectively heat water being delivered through the vertical supply pipe 78, as by connecting a source of steam or hot water through a conduit 92 having, for example, a manual valve 93, a solenoid valve 94 and a mixing valve 95 therein, the latter being controlled by a thermocouple disposed in the supply pipe 78 to establish a desired water temperature therein.

A suitable drain connection is made from the supply pipe 78 to drain fluid to an external facility such as a floor trench, which may take the form of a drain pipe 96 connected to the supply pipe 78 between the pump 79 and the steam conduit 92, the drain pipe 96 having a solenoid valve 97 therein for opening and closing the same.

To condition the system for the cleanup after use in a normal poultry chilling run, the drain plug 91 is first completely removed from the drain conduit 90 so as to permit the body of chilled water which is in the tank 15 to drain therefrom into a suitable floor trench or other waste disposable conduit.

The interior of the tank is then rinsed down, first with cold water to clean out blood, serum, and other constituents that hot water might set, and then with hot water to clean out grease. This may be done either automatically by supplying cold water through suitable timer controlled valves to the supply pipe 78, for example by opening solenoid valve 87 and closing valves 94 and 97 for a selected period while operating pump 79 and continuing to drive the flight 21, after which valve 87 may be closed terminating city water supply to the pump and valve 97 may be opened to drain the cold water from the tank. Then valve 97 may be closed, valve 87 opened and valve 94 opened to supply city water through conduit 88 and pump 79 to the supply pipe 78 and heat the same to approximate 180° F. by steam admitted through conduit 92, following which a drain cycle is initiated by closing valves 87 and 94 and opening valve 97. This periodic flushing and draining may be repeated several times if desired. Alternatively, the interior of the tank may be manually hosed down by operating personnel, using first cold water and then hot water for the reasons previously discussed.

Thereafter, the drain plug 91 is reinserted in the enlarged portion 90' if the drain conduit with the 6-inch head threaded into the outlet opening 90a' and the basket strainer in the sump tank 86 is filled with the suitable sanitizing chemicals. An automatic sequence is then initiated by a suitable electrical timer and valve control circuit to first open valves 87 and 94, with valve 97 closed, to fill the tank 17 with approximately 180° F. water until the sump float cuts off the valve 87. This filling phase may be accomplshed without the pump 79 being energized and the pump 79 may be energized by a suitable switch on the sump float to cut on the pump when the water level reaches the desired level. Under timer control, this sanitizing cycle continues for a suitable period, for expample, about 20 minutes, with the flight rotating so that sanitizing chemical mixed with the heated water is supplied through the clean up nozzles 75 and 83 to the interior of the tank to thoroughly clean the surfaces intercepting the nozzle spray, some of the cleaning water being also passed through the air headers 62, tubing 61, and nozzles 60 to also clean the air system.

At the completion of the timed sanitizing cycle, the electrical circuitry closes the valves 94 and opens the dump valve 97 in drain 96 while keeping valve 87 closed, to allow the cleaning solution to pump to the drain pipe 96 for a suitable period. An additional rinse cycle is then performed by reopening valve 87 and 94 and closing valve 97 to refill the tank with 180° F. water up to the float level, after which the valves 87 and 94 are closed and the dump valve 97 reopened to drain the rinse water from the tank. A further additional fill and dump cycle may be performed if desired, in the same manner. The plug is then withdrawn from the drain conduit 90, again reversed and reinstalled with the 4-inch head threaded into the smaller diameter portion of the drain conduit 90, the strainer in the sump tank 86 may then be removed and cleaned, and the system is ready to be again used for poultry chilling operations.

The apparatus herein described provides a poultry chiller which has a high rate of chilling efficiency, thus permitting attainment of the desired reduced poultry temperatures with minimum tank lengths in a short period of time compared with former processes. Because of the washing action provided by the counterflowing chilling liquid and the air and mechanical agitation, the appearances of the birds is enhanced and moisture content is increased for improved flavor and juiciness. The coupling of refrigerant through the tubes of the conveyor flight of open network construction in intimate thermal transfer relationship with the chilled liquid and the birds reduces the rate of heating of the liquid and enhances chilling of the birds, without the use of ice in the tank which would introduce considerable added expense and labor. This refrigerant cooling action can be still further increased by providing a refrigerant jacket in the side wall 16 of the tank 15, extending entirely around the tank or about the region thereof below the liquid level, and over the axial length of the tank.

While only one form of the present invention has been particularly shown and described, it will be apparent that various modifications may be made within the spirit and scope of the invention, and it is desired, therefore, that only such limitations be placed on the invention as are imposed by the prior art and set forth in the appended claims.

I claim:

1. The process of chilling freshly killed birds and the like which comprises maintaining an elongated chilled liquid bath of a selected depth sufficient for submersion of a large quantity of birds therein, advancing birds along a feed path from a feed end of said bath to a discharge end thereof by propelling forces exerted on the birds along a plural convolution helical path progressing in selected angular relation about the longitudinal axis of the bath, introducing chilled liquid appreciably below the entering body temperature of the birds into said bath at the discharge end thereof at a selected rate and withdrawing liquid at the surface level of the liquid bath from an overflow zone at the feed end of said bath to maintain a counterflow of chilled liquid relative to the direction of bird movement along said feed path, exerting forces on the birds for constantly tumbling them and periodically elevating them above the liquid surface as they advance along the feed path to effect introduction of moisture into the bird tissues, discharging pressurized air into said liquid bath adjacent the bottom thereof at air injection points spaced along the whole length of the bath to effect scrubbing action on the birds through air agitation of the liquid and enhance thermal transfer between the birds and the liquid, mechanically agitating the birds in the intermediate longitudinal region of the bath by agitating members spaced longitudinally between successive convolutions of said helical path, and removing the birds from the bath at the discharge end thereof.

2. The method of chilling freshly killed birds as defined in claim 1, wherein said pressurized air is discharged inwardly of the bath along directions disposed at a substantially 45° angle toward the discharge end of the bath and at a substantially 45° angle opposite to said selected angular direction.

3. The process of chilling freshly killed birds and the like which comprises maintaining an elongated chilled liquid bath of a selected depth sufficient for submersion of a large quantity of birds therein, advancing birds along a feed path from a feed end of said bath to a discharge end thereof, introducing chilled liquid appreciably below the entering body temperature of the birds into said bath at the discharge end thereof at a selected rate and withdrawing liquid at the surface level of the liquid bath from an overflow zone at the feed end of said bath to maintain a counterflow of chilled liquid relative to the direction of bird movement along said feed path, exerting forces on the birds for constantly tumbling them and periodically elevating them above the liquid surface as they advance along the feed path to effect introduction of moisture into the bird tissues, discharging pressurized air into said liquid bath adjacent the bottom thereof at air injection points spaced along the whole length of the bath to effect scrubbing action on the birds through air agitation of the liquid and enhance thermal transfer between the birds and the liquid, mechanically agitating the birds in the intermediate longitudinal region of the bath, and removing the birds from the bath at the discharge end thereof, the locations of said air injection points for pressurized air discharge into the bath being confined to regions spaced from said overflow zone to establish a quiet region of substantially no air agitation in the immediate vicinity of said overflow zone for effecting collection of floating grease in said quiet region for withdrawal from said overflow zone.

4. The process of chilling freshly killed birds and the like which comprises maintaining an elongated chilled liquid bath of a selected depth sufficient for submersion of a large quantity of birds therein, advancing birds along a feed path from a feed end of said bath to a discharge end thereof, introducing chilled liquid appreciably below the entering body temperature of the birds into said bath at the discharge end thereof at a selected rate and withdrawing liquid at the surface level of the liquid bath from an overflow zone at the feed end of said bath to maintain a counterflow of chilled liquid relative to the direction of bird movement along said feed path, exerting forces on the birds for constantly tumbling them and periodically elevating them above the liquid surface as they advance along the feed path to effect introduction of moisture into the bird tissues, discharging pressurized air into said liquid bath adjacent the bottom thereof at air injection points spaced along the whole length of the bath to effect scrubbing action on the birds through air agitation of the liquid and enhance thermal transfer between the birds and the liquid, mechanically agitating the birds in the intermediate longitudinal region of the bath, and removing the birds from the bath at the discharge end thereof, water sprays being directed downwardly on the surface of the liquid bath from locations spaced above said surface over a substantial portion of the length of the bath from said feed end, said water sprays being inclined to said surface and directed at an angle toward said feed end to enhance washing of birds emerging above said surface and propel grease floating on said surface toward said overflow zone.

5. Apparatus for chilling freshly killed poultry comprising a stationary elongated cylindrical tank having its axis mounted substantially horizontally, said tank having a cylindrical side wall and feed and discharge end walls, means for supplying chilled liquid to said tank adjacent said discharge end wall and overflow opening means for withdrawing liquid through the feed end wall at a selected overflow level above the level of the center axis of the tank establishing a predetermined liquid surface level therein, a screw type conveyor flight rotatably supported within said tank for advancing the poultry from the feed end to the discharge end including a center shaft extending along said center axis through said end walls and a helical vane member of open network construction formed of a spiral pattern of circumferentially spaced radial post members projecting from said center shaft and plural tubular members concentric with said center shaft fixed to said post members along spiral paths of different radii providing spaces therebetween for flow of chilled liquid sized to prevent passage of poultry carcasses therethrough, the outer perimeter of said flight being located closely adjacent the side wall of said tank, said discharge end wall having a poultry discharge opening above said liquid surface level, and means on said shaft adjacent said discharge end wall to lift poultry carcasses advanced thereto by said flight to said discharge opening and discharge the same therethrough.

6. Apparatus for chilling poultry as defined in claim 5, wherein said flight includes hollow radial headers at the opposite ends thereof connected to said tubular members, and means for coupling refrigerant to said headers including refrigerant supply and return lines in said center shaft to circulate refrigerant through said tubular members along the length of the flight in intimate thermal transfer relation with the poultry and chilled liquid.

7. Apparatus for chilling poultry as defined in claim 6, including a transfer header on said shaft intermediate the ends of said flight having fluid passage means selectively interconnecting longitudinally and radially subdivided groups of said tubular members occupying smaller and larger radius spiral paths in a manner to substantially equalize the fluid flow resistance characteristics of the radially subdivided groups of tubular members notwithstanding differences in their radii.

8. Apparatus for chilling poultry as defined in claim 5, wherein said flight includes support rods at the outer perimeter thereof paralleling said center axis at circumferentially spaced locations corresponding to said post members rigidly fixed to the radially outer ends of the latter and extending substantially the full length of the flight to structurally brace the flight and mechanically agitate the poultry and chilled liquid during rotation of the flight.

9. Apparatus for chilling poultry as defined in claim 8, including a plurality of mechanical agitating rods fixed to selected ones of said support rods between each of several convolutions of said flight in the central longitudinal region of the flight, said rods lying in parallel planes perpendicular to the center axis and having terminal inwardly convex curved portions located inwardly of the outer perimeter of the flight to engage and force poultry away from said side wall upon rotation of the flight.

10. Apparatus for chilling poultry as defined in claim 9, wherein said apparatus includes an air agitating system comprising air injection nozzles in the side wall of said tank below said liquid surface spaced at predetermined intervals axially of the tank along substantially the whole length thereof, pressurized air supply means for discharging pressurized air through said nozzles into the chilled liquid to agitate the same and enhance scrubbing action on the poultry and thermal transfer between poultry and liquid, said overflow opening means being located to one side of the vertical plane of said center axis, and said air injection nozzles being of a selected smaller number at said one side of said plane in the area from said feed end wall to an intermediate location in said tank relative to the number in the other regions of similar area of the tank to provide a substantially quiet zone of reduced air agitation immediately adjacent said overflow opening means for enhancing collection of floating grease in said quiet zone for removal through said overflow opening means.

11. Apparatus for chilling poultry as defined in claim 5, wherein said apparatus includes an air agitating system comprising air injection nozzles in the side wall of said tank below said liquid surface spaced at predetermined intervals axially of the tank along substantially the whole length thereof, pressurized air supply means for discharging pressurized air through said nozzles into the chilled liquid to agitate the same and enhance scrubbing action on the poultry and thermal transfer between poultry and liquid, said overflow opening means being located to one side of the vertical plane of said center axis, and said air injection nozzles being of a selected smaller number at said one side of said plane in the area from said feed end wall to an intermediate location in said tank relative to the number in the other regions of similar area of the tank to provide a substantially quiet zone of reduced air agitation immediately adjacent said overflow opening means for enhancing collection of floating grease in said quiet zone for removal through said overflow opening means.

12. Apparatus for chilling freshly killed poultry comprising a stationary elongated cylindrical tank having its axis mounted substantially horizontally, said tank having a cylindrical side wall and feed and discharge end walls, means for supply chilled liquid to said tank adjacent said discharge end wall and overflow opening means for withdrawing liquid through the feed end wall at a selected overflow level above the level of the center axis of the tank establishing a predetermined liquid surface level therein, a screw type conveyor flight rotatably supported within said tank for advancing the poultry from the feed end to the discharge end including a center shaft extending along said center axis through said end walls and a helical vane member fixed thereto having its perimeter closely adjacent the side wall of the tank, means at the discharge end for lifting the poultry above the liquid surface and discharging the same from the tank, an air agitating system comprising air injection nozzles in the side wall of said tank below said liquid surface spaced at predetermined intervals axially of the tank along substantially the whole length thereof, pressurized air supply means for discharging pressurized air through said nozzles into the chilled liquid to agitate the same and enhance scrubbing action on the poultry and thermal transfer between poultry and liquid, said overflow opening means being located to one side of the vertical plane of said center axis, and said air injection nozzles being of a selected smaller number at said one side of said plane in the area from said feed end wall to an intermediate location in said tank relative to the number in the other regions of similar area of the tank to provide a substantially quiet zone of reduced air agitation immediately adjacent said overflow opening means for enhancing collection of floating grease in said quiet zone for removal through said overflow opening means.

13. Apparatus for chilling poultry as defined in claim 12, wherein said flight includes support rods at the outer perimeter thereof paralleling said center axis at circumferentially spaced locations rigidly fixed to said outer perimeter to structurally brace the flight and mechanically agitate the poultry and chilled liquid during rotation of the flight.

14. Apparatus for chilling poultry as defined in claim 13, including a plurality of mechanical agitating rods fixed to selected ones of said support rods between each of several convolutions of said flight in the central longitudinal region of the flight, said rods lying in parallel planes disposed at a selected angle to radii of the center axis to engage and agitate poultry upon rotation of the flight.

15. Apparatus for chilling poultry as defined in claim 12, including a plurality of water spray nozzles in said tank side wall above the liquid surface therein along the region of the tank from substantially the longitudinal center thereof to said feed end wall, means for supplying water under pressure to said water spray nozzles, and said water spray nozzles being directed at an angle toward said feed end and to said liquid surface to discharge water spray patterns to enhance washing of poultry which emerges above said surface and propel floating grease toward said overflow opening means.

16. Apparatus for chilling poultry as defined in claim 12 including a sanitizing system for periodic clean up of the interior of the tank, said santizing system comprising a plurality of spray nozzles located throughout the interior of the tank for discharging spray patterns of sanitizing solution on all surfaces of the flight and tank interior, means for supplying a liquid sanitizing solution under pressure to said nozzles during a selected operating period to discharge the same into said tank over the exposed surfaces in the interior thereof, and means for supplying a selected proportion of the liquid sanitizing solution to said air injection nozzles and adjoining portions of the air supply means communicating therewith to clean the interior surfaces of said air injection nozzles.

17. Apparatus for chilling poultry as defined in claim 12, including a sanitizing system for facilitating periodic clean up of the interior of said tank, said sanitizing system comprising a plurality of spray nozzles located throughout the interior of said tank for directing spray patterns of sanitizing solution onto the surfaces of said flight and tank interior during a sanitizing period including a first set of spray nozzles on said shaft directed outwardly thereof and located between the convolutions of said flight over the axial length of the flight, said first set of spray nozzles being submerged in said chilling liquid during normal operations of said apparatus to chill poultry, and means for supplying selected pressurized air pressure from said pressurized air supply means to said first set of nozzles during said normal operation to prevent migration of chilling liquid into said first set of spray nozzles.

18. Apparatus for chilling freshly killed poultry comprising a stationary elongated cylindrical tank having its axis mounted substantially horizontally, said tank having a cylindrical side wall and feed and discharge end walls, means for supplying chilled liquid to said tank adjacent said discharge end wall and overflow opening means for withdrawing liquid through the feed end wall at a selected overflow level above the level of the center axis of the tank establishing a predetermined liquid surface level therein, a screw type conveyor flight rotatably supported within said tank for advancing the poultry from the feed end to the discharge end including a center shaft extending along said center axis through said end walls and a helical vane member fixed thereto having its perimeter closely adjacent the side wall of the tank, means at the discharge end for lifting the poultry above the liquid surface and discharging the same from the tank, a sanitizing system for periodic clean up of the interior of the tank, said sanitizing system comprising a plurality of spray nozzles located throughout the interior of the tank for discharging spray patterns of sanitizing solution on all surfaces of the flight and tank interior, and means for supplying a liquid sanitizing solution under pressure to said nozzles during a selected operating period to discharge the same into said tank over the exposed surfaces of the interior thereof, means for supplying rinsing water through said sanitizing system to said spray nozzles and periodically draining liquid accumulations from said tank for rinsing said exposed surfaces following spraying of sanitizing solution thereon, said spray nozzles including a first set of spray nozzles on said shaft directed outwardly thereof and located between the convolutions of said flight over the axial length of the flight, and means for supplying selected pressurized air pressure to said first set of nozzles during said normal operation to prevent migration of chilling liquid into said first set of spray nozzles.

References Cited

UNITED STATES PATENTS

| | | | |
|---|---|---|---|
| 2,961,853 | 11/1960 | Cohrt | 62—303 X |
| 2,979,914 | 4/1961 | Garland | 62—64 |
| 3,091,099 | 5/1963 | Sharp | 62—376 |
| 3,097,501 | 7/1963 | Pappas | 62—64 X |
| 3,240,026 | 3/1966 | Van Dolah et al. | 62—63 |
| 3,320,964 | 5/1967 | Tripp | 62—303 X |
| 3,340,696 | 9/1967 | Zebarth et al. | 62—64 X |

ROBERT A. O'LEARY, *Primary Examiner.*

W. E. WAYNER, *Assistant Examiner.*